（12） United States Patent
Yoshimura et al.

(10) Patent No.: US 6,338,622 B2
(45) Date of Patent: *Jan. 15, 2002

(54) PIPE EXTRUSION DIE

(75) Inventors: Yoshihiro Yoshimura; Katunari Nishimura; Takumi Murata; Masahiro Yamada, all of Yamaguchi (JP)

(73) Assignee: Mitsui Chemicals, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/952,476
(22) PCT Filed: Mar. 13, 1997
(86) PCT No.: PCT/JP97/00805
  § 371 Date: Feb. 13, 1998
  § 102(e) Date: Feb. 13, 1998
(87) PCT Pub. No.: WO97/35704
  PCT Pub. Date: Oct. 2, 1997

(30) Foreign Application Priority Data

Mar. 25, 1996 (JP) ............................................. 8-067750

(51) Int. Cl.[7] ............................................. B29C 47/20
(52) U.S. Cl. ..................... 425/380; 425/382.4; 425/461; 425/467
(58) Field of Search ............................ 425/133.1, 380, 425/381, 382.4, 461, 467

(56) References Cited

U.S. PATENT DOCUMENTS

| 2,629,898 | A | * | 3/1953 | Orsini | ........................ 425/467 |
| 3,026,565 | A | * | 3/1962 | Bonner | ........................ 425/380 |
| 3,303,247 | A | * | 2/1967 | Carter et al. | ................. 425/380 |
| 3,452,125 | A | * | 6/1969 | Schurman et al. | |
| 3,491,406 | A | * | 1/1970 | Davidson | .................. 425/382.4 |
| 3,899,276 | A | * | 8/1975 | Sokolow | ...................... 425/380 |
| 4,173,446 | A | * | 11/1979 | Larsen | ........................ 425/380 |
| 4,344,907 | A | * | 8/1982 | Herrington | ................ 425/382.4 |
| 4,518,343 | A | | 5/1985 | Seiffert | ........................ 425/466 |
| 5,030,082 | A | * | 7/1991 | Reifenhauser et al. | ... 425/382.4 |
| 5,273,421 | A | * | 12/1993 | Kanoh et al. | ................ 425/467 |
| 5,518,676 | A | * | 5/1996 | De Rocheprise | ............ 425/467 |

FOREIGN PATENT DOCUMENTS

| DE | 11 71 147 | 5/1964 |
| DE | 26 10 972 | 9/1977 |
| JP | 62-202713 | 9/1987 |
| JP | 4-135731 | 5/1992 |

* cited by examiner

Primary Examiner—Nam Nguyen
Assistant Examiner—Joseph Leyson

(57) ABSTRACT

A pipe molding die of the present invention is capable of rectifying a flow of a molten resin by a resin reservoir and uniformizing the flow of the resin extruded from the die in whichever position in a peripheral direction on a flow path within the die. Consequently, ununiformity in wall thickness of the resin pipe to be molded can be eliminated. The pipe molding die comprises a throttle part as one of components thereof, which includes a core, a shell part fitted to the core and a resin reservoir as a portion of a flow path which is formed between the core and the shell part. A molten, resin as a pipe raw material flows through the flow path. The resin reservoir is provided in at least one of the core and the shell part, and takes a ring-like shape circumscribing a central axis of the pipe molding die with the central axis centered. The resin reservoir assumes a recessed shape in cross-section.

20 Claims, 6 Drawing Sheets

PIPE EXTRUSION DIE

TECHNICAL FIELD

The present invention relates to a pipe molding die and a resin pipe molded by the pipe molding die.

BACKGROUND ART

A pipe molding die is employed for manufacturing an elongate resin pipe such as a polypropylene pipe and a polyethylene pipe that are used as, e.g., gas pipes.

The pipe molding die is supplied, from a resin extruder, with a molten kneaded resin (the molten kneaded resin will hereinafter be termed a "molten resin") defined as a raw material for the resin pipe. The supplied molten resin is discharged finally in the form of a resin pipe as an extrusion molded product from the die via a flow path within the die. According to procedures thereof, the molten resin supplied into the die is temporarily expanded in a cylindrical shape, and thereafter gradually throttled down into a pipe in the end that has a diameter corresponding to an application.

In general, the pipe molding die is basically constructed of a die part, a throttle part and a land part. The die part forms the molten resin supplied in from a resin extruder in a cylindrical shape. The throttle part gives a rectifying effect by throttling the cylindrical molten resin fed in from the die part. And the land part uniforms a flow velocity of the resin. Then, those constructive parts are each concentrically arranged in sequence from an upstream side to a downstream side in a flowing direction of the molten resin.

The resin pipe as an extrusion molded product manufactured by the pipe molding die described above is required to have no ununiformity in terms of wall thickness. Namely, it is required that both of an inner surface configuration and an outer surface configuration of the resin pipe be concentrically complete rounds as viewed in cross-section.

It is because problems as shown in the following items (1)–(3) might arise if the pipe has the ununiformity in wall thickness.

(1) It is undesirable in terms of external appearance.

(2) A core deviation tends to occur when in a butt seam fusion to fuse end surfaces of the pipe by butting them with each other.

(3) Contaminations and flaw on the surface of the pipe are undesirable for joining a Joint to the pipe by fusion, and therefore the pipe surface is required to be cut. In that case, an outer peripheral surface of the pipe is fixed by a jig, and the pipe surface is cut by a cutting tool while moving the cutting tool along the pipe. If ununiformity in wall thickness is large, however, the pipe cannot be uniformly held by the jig because of the ruggedness on the pipe surface, with the result that there might be a firmly fixed portion and a slackened portion to make the pipe unstable. Further, since a distance between the outer surface of the pipe fixed by the jig and the cutting tool is not uniform, an adhesion is poor, and a complete round cannot be obtained even when cut off. Besides, unevenness in cutting is to appear. A cutting quantity must increase in order to-prevent the unevenness in cutting, and correspondingly extra pipe raw material is needed.

Such being the case, it is a general practice that a flow of the resin extruded from the die is kept constantly in whichever position on a flow path within the die to uniformize the wall thickness of the resin pipe to be molded by the pipe molding die. Methods of enhancing a rectifying effect and a throttle effect are effective in terms of keeping constantly the flow of the resin through the flow path.

For making an attempt to enhance the rectifying effect and the throttle effect as well, the die must be increased in size. When increasing the size of the die, a pressure necessary for flowing the molten resin has to be risen. Furthermore, if the pressure rises, a temperature of the molten resin increases enough to easily deteriorate the resin or to cause an excessive luster on the pipe surface to such an extent as to be visually undesirable, resulting in a devaluation of a commercial product. Then, pressure tightness of the die and of the extruder must be increased.

Moreover, according to the tests by the present inventors, it has proved that the ununiformity in wall thickness is to occur even when making an endeavor to enhance the rectifying effect and the throttle effect in the technologies contrived so far in the case of manufacturing a pipe that is equal to or larger than 8 mm in wall thickness.

It is an object of the present invention to provide a pipe molding die capable of simply preventing an occurrence of ununiformity in wall thickness of a resin pipe irrespective of a degree of desired dimension of the wall thickness of the resin pipe, and also a resin pipe molded by this pipe molding die.

SUMMARY OF THE INVENTION

A pipe molding die according to the present invention comprises a throttle part defined as one the constructive parts thereof. This throttle part includes a core, a shell part fitted to the core, and a resin reservoir as a portion of a flow path. The flow path is formed between the core and the shell part. A molten resin as a pipe raw material flows through the flow path.

The resin reservoir is provided in at least one of the core and the shell part and takes a ring-like shape circumscribing a central axis of the pipe molding die with the central axis centered. Further, the resin reservoir assumes a recessed shape in cross-section.

The thus constructed pipe molding die according to the present invention, a flow of the resin extruded from the die can be uniformized in whichever position on the flow path within the die owing to the resin reservoir, and it is therefore feasible to restrain a momentum of the flow of the molten resin. Consequently, the flow becomes smooth to enhance a rectifying effect. Accordingly, no ununiformity in wall thickness of the resin pipe to be molded can be seen.

Moreover, a capacity of the resin reservoir may be varied corresponding to a dimension of desired wall thickness of the molded resin pipe, i.e., the resin reservoir may be so formed as to decrease the capacity thereof in the case of a thin resin pipe but increase the capacity thereof in the case of a thick resin pipe. A quantity of the molten resin in a longitudinal direction (The longitudinal direction means from an upstream side to a downstream side of the flow path.) at the throttle part is thereby kept constant regardless of a degree of dimension of desired wall thickness of the resin pipe. The keeping constant of the quantity of the molten resin at the throttle part makes it possible to prevent an occurrence of the ununiformity in wall thickness of the resin pipe.

Thus, a size of the resin reservoir provided in the throttle part as one of the constructive parts of the die, is simply set corresponding to the wall thickness of the resin pipe to be molded, whereby the rectifying effect can be enhanced without increasing the size of the die itself.

The flow path described above may include a throttle taking a constricted shape narrower than other parts along this flow path, and this throttle may be formed with the resin reservoir described above.

Moreover, it is desired that the resin reservoir be formed in such a configuration as not to cause a stagnation and a residence (the stagnation and the residence are hereinafter generically termed a "stagnation") in the flow of the molten resin. It is desirable that a recess cross section of the resin reservoir is formed for example in a curved-surface configuration, especially a semi-circular configuration. In that case, it is preferable that a radius of curvature be 10 mm–100 mm, and an angle made by the central axis and each of tangential lines at both ends of a semi-circular arc of the resin reservoir be 15°–120°.

Further, it is more desirable that the radius of curvature be 25 mm, and the angle be 75°–90°.

The resin pipe according to the present invention is molded by using the pipe molding die as well as being molded of polyolefine as a pipe raw material.

Polyolefine as the pipe raw material is desirably polyethylene.

Furthermore, it is preferable that the resin pipe be manufactured so that an average wall thickness thereof is set to one of values in a range of 5 mm–50 mm, and that a difference between a maximum wall thickness and a minimum wall thickness of the pipe is equal to or smaller than 1.0 mm and, preferably, equal to or smaller than 0.3 mm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will hereinafter be described with reference to the drawings.

Figure 1:
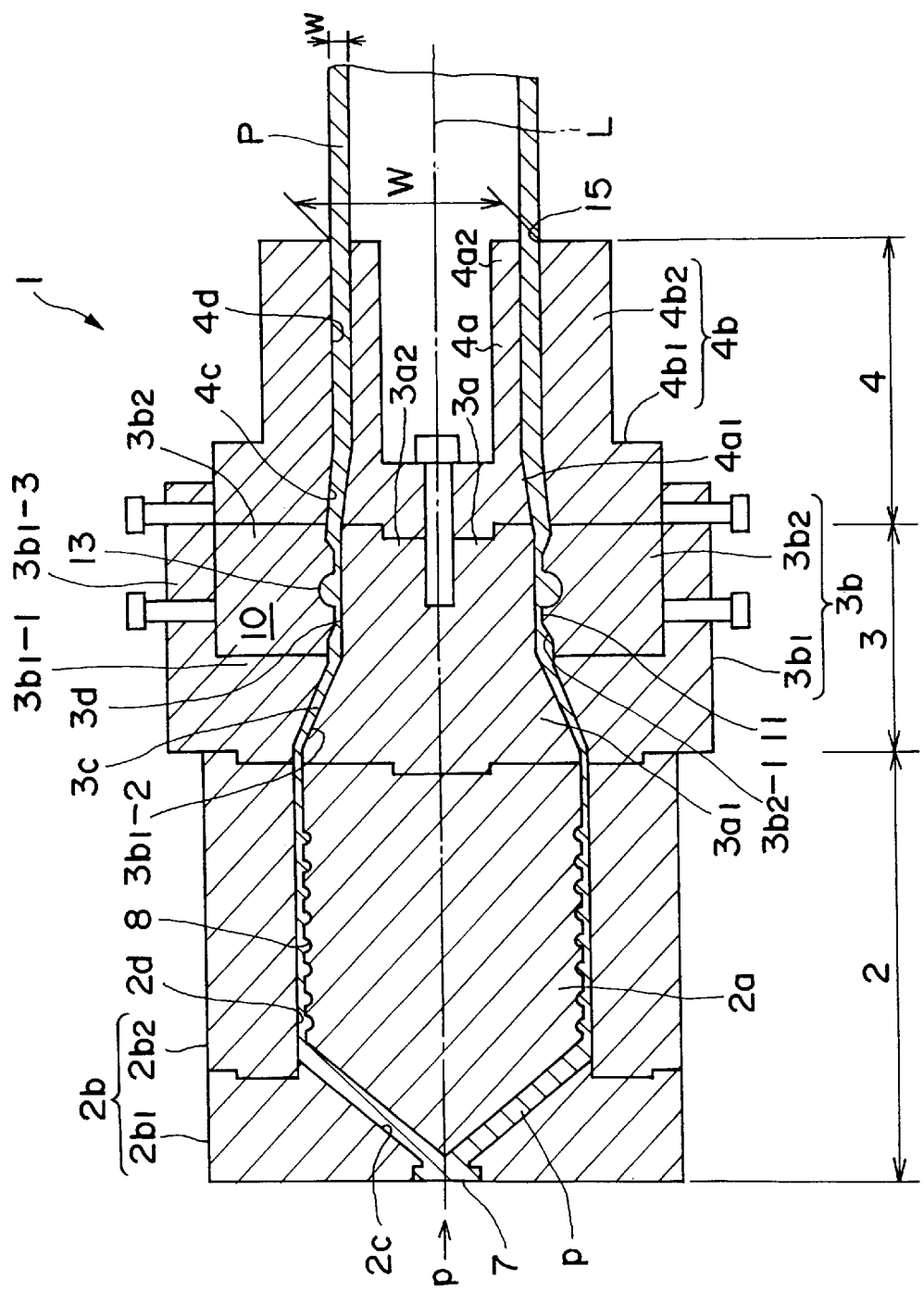
FIG. 1 is a vertical sectional view of a pipe molding die according to the present invention.

FIG. 1 is a vertical sectional view showing one example of a pipe molding die.

In this pipe molding die 1, a molten resin is supplied from a left end in FIG. 1, and similarly a resin pipe P having a desired diameter as an extrusion molded product, is discharged from the right end. More specifically, the left end side of FIG. 1 corresponds to an upstream side in a flowing direction of a molten resin p, while the right end side of the same corresponds to a downstream side. Hereinbelow, the upstream and downstream sides in the flowing direction of the molten resin p are simply termed an "upstream side" and a "downstream side".

The die 1 is constructed roughly of three parts. Briefly, they are a die part 2, a throttle part 3 and a land part 4. These parts are arranged in sequence from the upstream side to the downstream side of the molten resin p. Inside the individual parts 2, 3 and 4, consecutive flow paths which will be mentioned later on are provided respectively. Then, the molten resin p flows sequentially through those flow paths.

The die part 2 is a part located on the upstream side of the die 1 and is a part for receiving the molten resin p supplied from an unillustrated resin extruder. The molten resin p supplied to the die part 2 passes through the die part 2 and arrives at the throttle part 3.

Further, the die part 2 consists of a core 2a and a shell part 2b into which the core 2a is inset.

The core 2a is located on a central axis L of the die 1 and is a cylindrical body, an upstream-side end portion of which is conically pointed. Note that the throttle part 3 and the land part 4 respectively have a core 3a and a core 4a, which are also located on the central axis L.

The shell part 2b, which takes a cylindrical shape on the whole with one end opened and the other end closed, includes a disk-like proximal seat member $2b_1$ located at an upstream-side end and an external cylindrical portion $2b_2$ occupying other portions of the shell part 2b. The external cylindrical portion $2b_2$ is a hollow cylindrical member extending from a peripheral edge of the proximal seat member $2b_1$ toward the downstream side.

Further, the proximal seat member $2b_1$ has such a flat recessed portion as being hollowed out in a conical shape at the center thereof enough to receive the above upstream side end of the core 2a, and the external cylindrical portion $2b_2$ covers the cylindrical portion of the core 2a.

A flow path 2c and a flow path 2d of the die part 2 are respectively formed between the core 2a and the proximal seat member $2b_1$ and between the core 2a and the external cylindrical portion $2b_2$.

The flow path 2c looks like a generally trigonal pyramid shape as the whole (The flow path 2c appears a forked shape gradually expanding as it approaches the downstream side in FIG. 1.). Then, an apex side of the flow path 2c, which is located on the upstream side, is opened. Note that the aperture of the flow path 2c serves as a molten resin receiving port for receiving the molten resin into the pipe molding die 1 from the resin extruder, and is designated by the numeral 7.

The flow path 2d is continued with the right side of the flow path 2c, and takes a cylindrical configuration on the whole. In FIG. 1, the flow path 2d appears to be two lines of parallel passageways continuous from the forked flow path 2c. A diameter of the flow path 2d is larger than a diameter of the resin pipe P, and a screw groove 8 is formed in an internal peripheral portion of the flow path 2d.

The molten resin p entering the flow path 2d from the flow path 2c goes on flowing toward the throttle part 3 while changing its flowing shape into a cylindrical shape from a triangular conical shape as the flow thereof advances.

Note that the die part 2 has the screw groove 8 as stated above, and hence the die 1 is termed a spiral die. The die is classified, in addition to this, into a spider die, a cross head die, a basket die and other types of dies. In the great majority of cases, the spiral die is used, however, the variety of dies are separately employed according to the applications and necessities.

The throttle part 3 is a part located between the die part 2 and the land part 4, and is a part for giving a so-called rectifying effect. More specifically, as already mentioned, the throttle part 3 is a part which admits a passage of the molten resin p flowing in from the flow path 2d in the cylindrical shape on the whole while being temporarily expanded larger in terms of its diameter than the resin pipe P, and gradually throttles the diameter of the cylindrical molten resin p down to the diameter of the resin pipe P.

The throttle part 3 described above is constructed of a core 3a and a shell part 3b fitted to an outer portion of the core 3a.

The core 3a comprises a head-cut conical part $3a_1$ and a cylindrical part $3a_2$. The head-cut conical part $3a_1$ occupies a half on the upstream side and taking a head-cut conical shape, and a cylindrical part $3a_2$ similarly occupies a half on the downstream side and taking a cylindrical shape.

The shell part 3b has a fitting seat member 3b, and a throttle element $3b_2$. The fitting seat member $3b_1$-1 corresponds to the head-cut conical part 3a, of the core 3a, and the throttle element $3b_2$ corresponds to the cylindrical part $3a_2$ of the core 3a, respectively.

The fitting seat member $3b_1$ assumes a channel-like configuration in cross-section, and a side wall part $3b_1$-1 located on the upstream side thereof is formed with a hole $3b_1$-2 into which the head-cut conical part $3a_1$ is inserted, taking the same configuration as this. Further, the cylindrical part $3a_2$ of the core 3a is located on the central axis L in a space 10 surrounded by a peripheral wall part $3b_1$-3 of the fitting seat member $3b_1$. Then, the ring-like throttle element $3b_2$ is fitted to an outer periphery of this cylindrical part $3a_2$.

When the core 3a and the throttle element $3b_2$ are fitted to the fitting seat member $3b_1$, a flow path 3c is formed between the hole $3b_1$-2 of the side wall part $3b_1$-1 of the fitting seat member $3b_1$ and the head-cut conical part $3a_1$ of the core 3a, and a flow path 3d is formed between the throttle element $3b_2$ and the cylindrical part $3a_2$ of the core 3a.

The flow path 3c which is a flow path is continued with the right side of the flow path 2d of the die part 2 and formed a head-cut conical shape on the whole, and the head-cut side thereof is directed toward the downstream side. The flow path 3c appears to be two lines of passageways narrowing down on the downstream side in FIG. 1.

The flow path 3d is continued with the right side of the flow path 3c and assumes the cylindrical shape on the whole. Further, the flow path 3d is smaller in diameter than the flow path 2d similarly taking the cylindrical shape in the die part 2. The flow path 3d appears as two lines of parallel passageways continuous from the flow path 3c in FIG. 1. The flow path 3d is wide both at the upstream end and at the downstream end thereof, but is constricted narrowly at the central portion. This constricted part is referred to as a throttle designated by the numeral 11. The throttle 11 is formed in such a manner that the central part of an inner peripheral surface $3b_2$-1 of the throttle element $3b_2$ is protruded in a trapezoidal shape on the side of the central axis L.

Figure 2:
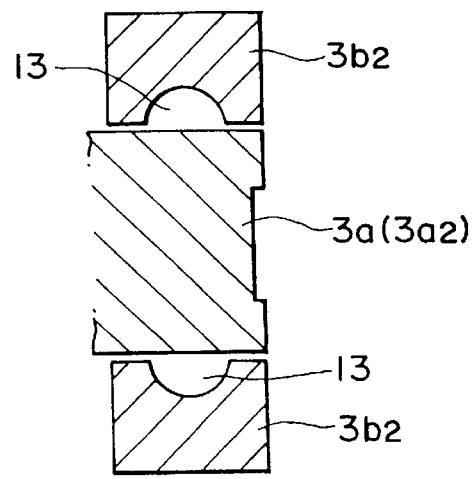
FIG. 2 is an enlarged view of the principal portion in FIG. 1.
Figure 3:
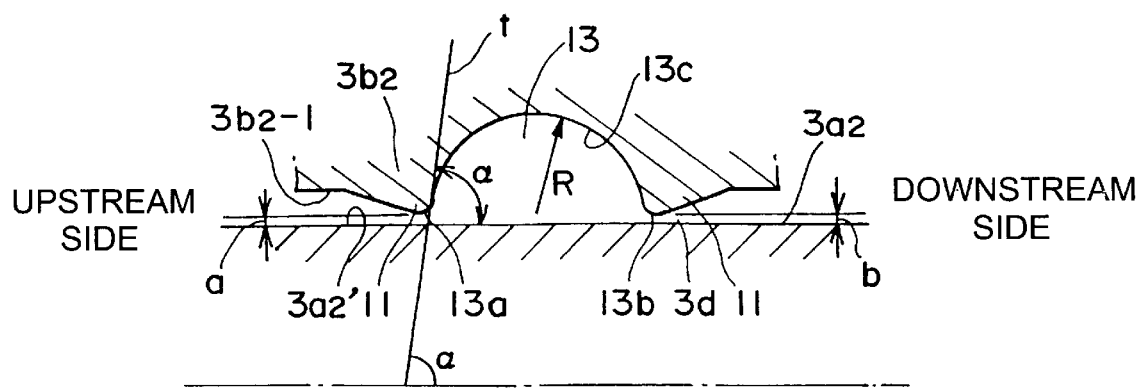
FIG. 3 is an enlarged view of the principal portion in FIG. 2.

The throttle 11 is, as obvious from FIG. 3, provided with a resin reservoir 13 serving as a portion of the flow path 3d at the central portion thereof. The throttle part 11 includes a first portion preceding the resin reservoir 13 which constricts the flow path 3d, and a second portion following the resin reservoir 13 where the flow path 3d is expanded. The molten resin flows along the flow path 3d and through the reservoir 13 in a direction substantially parallel to the central longitudinal axis L of said pipe molding die 1. The resin reservoir 13, which is a recessed portion provided in the throttle 11 and opened on the side of the central axis L, has a ring-like annular shape about the central axis L. The resin reservoir 13 extends around the shell part 3b in a direction perpendicular to the central axis L. Further, the resin reservoir 13, as obvious from FIGS. 2 and 3, is semi-circular in cross-section and is 25 mm in curvature radius R. The curvature radius R is not, however, limited to 25 mm and, though an acceptable range may be 10 mm–100 mm, desirably falls within a range of preferably 10 mm–50 mm in terms of enhancing the rectifying effect and preventing so-called black burning by decreasing a residence time of the molten resin within the resin reservoir 13.

The throttle part 11 includes a first constricting portion 13a (see FIG. 3) immediately preceding the resin reservoir 13 which constricts the flow path 3d. FIGS. 1, 2 and 4–7 show variations (not numbered) of the first constricting portion 13a. The first constricting portion 13a circumscribes the central longitudinal axis L of the pipe molding die 1. The first constricting portion 13a has a continuous annular shape of constant diameter around an entire circumference thereof. Molten resin flows past the first constricting portion 13a in a direction substantially parallel to the central longitudinal axis L of the pipe molding die 1. The throttle part 11 further includes a second constricting portion 13b (see FIG. 3) immediately following the resin reservoir 13 which constricts the flow path 3d. FIGS. 1, 2 and 4–7 show variations (not numbered) of the second constricting portion 13b. The second constricting portion 13b circumscribes the central longitudinal axis L of the pipe molding die 1. The second constricting portion 13b has a continuous annular shape of constant diameter around an entire circumference thereof. Molten resin flows past the second constricting portion 13b in a direction substantially parallel to the central longitudinal axis L of the pipe molding die 1.

Also, as shown in FIG. 3, and set within a range of 75–90°; is an angle α made by a tangential line t drawn at the upstream-side end 13a and at the downstream-side end 13b of the resin reservoir 13 (only one tangential line drawn at the upstream-side end 13a is shown). In other words, drawn at the two ends 13a, 13b of a semi-circular arc 13c in cross-section of the resin reservoir 13, and by the central axis L (in other words, a wall surface $3a_2'$ of the cylindrical part $3a_2$ parallel to the central axis L). The angle α is not, however, confined to the range of 75–90° and may fall within a range of 15°–120°. In short, this range may be the one enough to enhance the rectifying effect by the resin reservoir 13, not to cause a stagnation and to prevent the black-burning, and preferably the one of 75–90° in terms of the effect. The numerical values given above are calculated based on an endorsement through the tests implemented by the present inventors.

Note that the angle α is shown in the Figures in the two cases of its being made by the tangential line t and the central axis L, and by the tangential line t and the wall surface $3a_2'$ of the cylindrical part $3a_2$ parallel to the central axis L.

Moreover, the two ends 13a, 13b of the circular arc are so formed as to be curvilinearly bent enough not to hinder a small influx of the molten resin. Then, gaps "a", "b" between the two ends 13a, 13b and the cylindrical part $3a_2$ are set to 2 mm. The gaps are not, however, limited to 2 mm and are, though an acceptable range may be 0.5 mm–5 mm, desirably set to a range of preferably 1 mm–3 mm.

Figure 4:
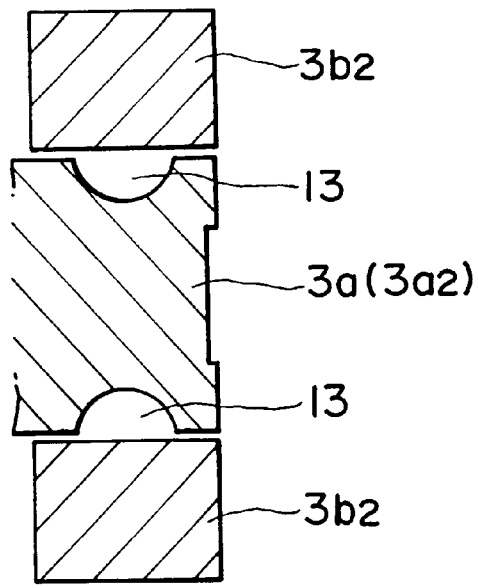
FIG. 4 is an example of variation of that shown in FIG. 2, in which a portion for forming a resin reservoir is different.
Figure 5:
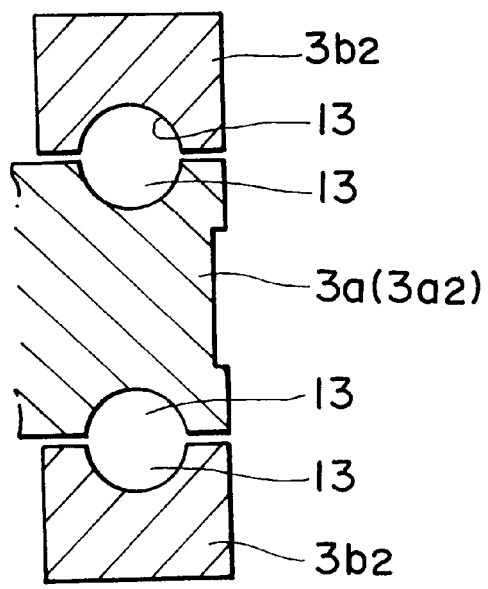
FIG. 5 is another example of variation of that shown in FIG. 2, in which the portion for forming the resin reservoir is different.

Then, the resin reservoir 13 is not provided in the fitting seat member $3b_1$ but may be, as illustrated in FIG. 4, provided in the cylindrical part $3a_2$ of the core 3a. Further, as shown in FIG. 5, the resin reservoir 13 may be provided in both of those parts.

Moreover, the throttle 11 formed with the resin reservoir 13 may be provided at the cylindrical part $3a_2$ of the core 3a and may be provided both at the throttle element $3b_2$ and at the cylindrical part $3a_2$.

Further, the cross-sectional shape of the resin reservoir 13 may be, in addition to the semi-circular shape, shapes of smoothly curved surfaces such as circular arcs in other forms, a part of elliptical shape parabolic shape and so forth causing no stagnation of the flow of the molten resin p. However, the semicircular shape in cross section is the best in terms of causing no stagnation of the flow of the molten resin, and is easy to work.

The resin reservoir 13 may be formed in other places than the throttle 11 in the flow path 3d.

Figure 6:
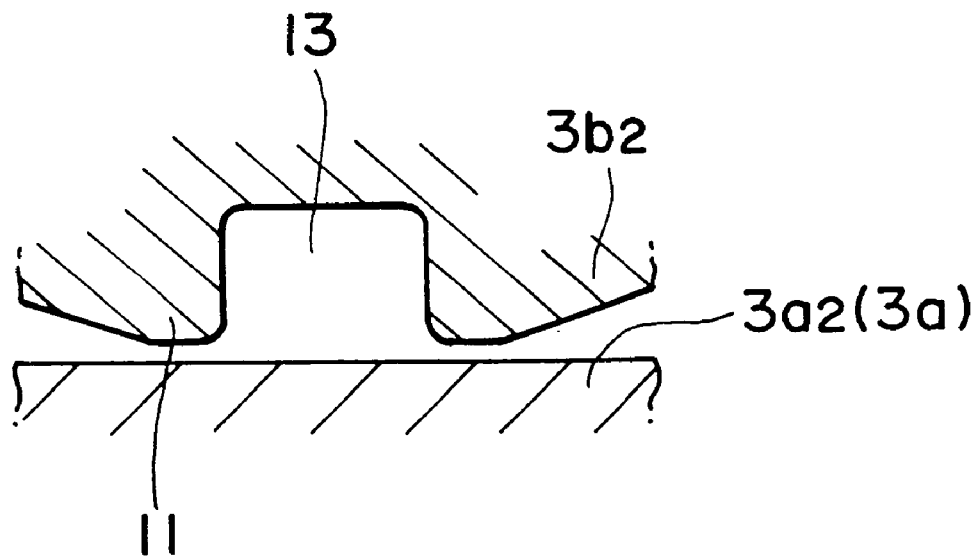
FIG. 6 is a view showing a comparative example with a resin reservoir according to the present invention.
Figure 7:
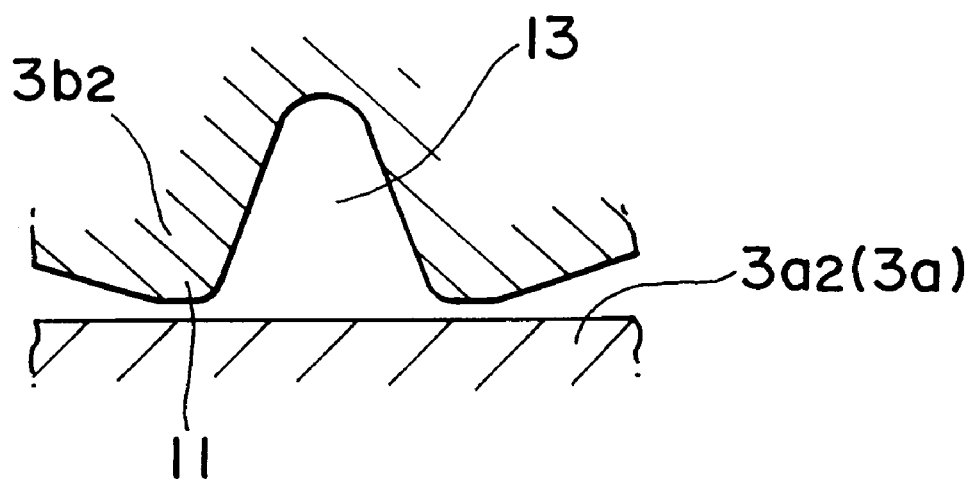
FIG. 7 is a view showing another comparative example with the resin reservoir according to the present invention.

Note that FIGS. 6 and 7 show a comparative examples with the resin reservoir 13 according to the present invention. If the resin reservoir 13 takes a rectangular shape in cross-section with corners rounded as illustrated in FIG. 6 or an isosceles triangular shape in cross-section with an apex rounded as shown in FIG. 7, it might happen that the molten resin is stagnated at the corners and the apex thereof. As the result, the resin is burned black and the burned substances are adhered to the corners and the apex as well. Accordingly, it is of importance how the configuration of the resin reservoir 13 is selected.

The land part 4 is a part, located on the downstream side of the die 1, for uniformizing a flow velocity of the molten resin.

Such land part 4 is constructed of a core 4a and a shell part 4b fitted to an outer portion of the core 4a.

The core 4a has a configuration similar to the core 3a of the throttle part 3, and is constructed of a head-cut conical part $4a_1$ corresponding to the head-cut conical part $3a_1$ and a cylindrical part $4a_2$ corresponding to the cylindrical part $3a_2$ of the core 3a. The head-cut conical part $4a_1$ is, however, by far smaller in difference between the upstream side and the downstream side than in the head-cut conical part $3a_1$. Further, the head-cut conical part $4a_1$ is hollow.

The shell part 4b includes a flange member and takes a cylindrical shape on the whole. The shell part 4b comprises a flange part $4b_1$ having the same major diameter as that of the throttle element $3b_2$ of the core 3a and being contiguous to the throttle element $3b_2$, and an outer cylindrical part $4b_2$ extending from a portion, closer to the central axis L, of the flange part $4b_1$ toward the downstream side.

A flow path 4c and a flow path 4d of the land part 4 are respectively formed between the head-cut conical part $4a_1$ of the core 4a and the flange part 4b, of the outer shell part 4b, and between the cylindrical part $4a_2$ of the core 4a and the outer cylindrical part $4b_2$ of the outer shell part 4b.

The flow path 4c is a flow path continuous on the right side of the flow path 3d of the throttle part 3 and takes an extremely gently slant head-cut conical shape, and a head-cut side thereof is directed rightward in FIG. 1. The flow path 4c appears to be two lines of passageways in which a spacing therebetween is narrowed down extremely gently from the flow path 3d of the throttle part 3 as it approaches toward the downstream side in FIG. 1.

The flow path 4d is continued with the right side of the flow path 4c and assumes a cylindrical configuration on the whole. The flow path 4d is smaller in diameter than the flow path 3d similarly taking the cylindrical shape. The flow path 4d appears two lines of parallel passageways continuous from the flow path 4c in FIG. 1, wherein a width dimension "w" of each of the passages appearing parallel is so set as to be a wall thickness of the resin pipe P defined as an extrusion molded product. A diametrical dimension "W" of the flow path 4d is, i.e., a diametrical dimension of the resin pipe P.

Incidentally, what is indicated by the numeral 15 is an outlet of the flow path 4d, in other words, a pipe discharge port of the die 1, from which the resin pipe P defined as the extrusion molded product is finally discharged.

According to the thus constructed die 1, when the molten resin p from the resin extruder is supplied into the die 1 through a molten resin receiving port 7, this molten resin p is led inwardly of the die 1 along a route such as flow path 2c→flow path 2d→flow path 3c→flow path 3d→flow path 4c→flow path 4d, and thereafter discharged, in the form of the resin pipe P as the extrusion molded product, out of the pipe discharge port 15 of the die 1.

Figure 8:
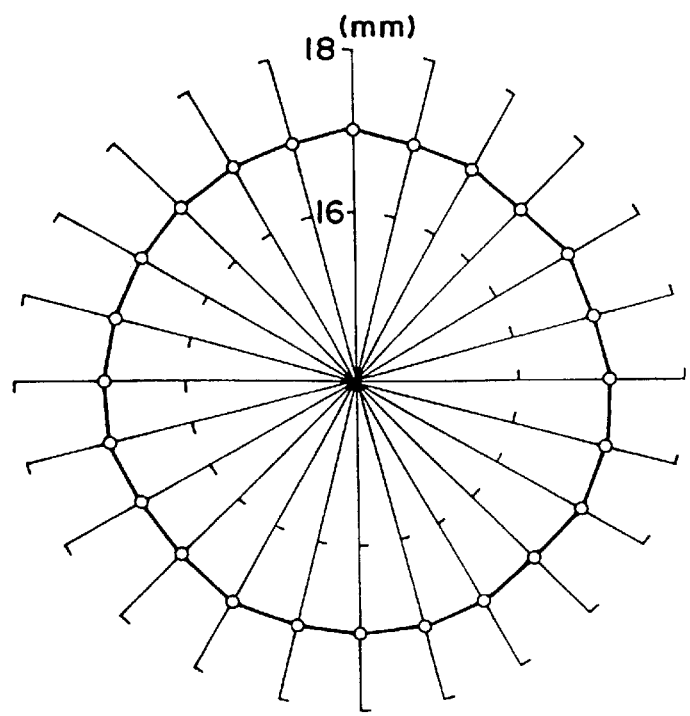
FIG. 8 is a diagram showing a distribution of wall thickness of a polyethylene pipe molded by a pipe molding die according to the present invention.

FIG. 8 shows a distribution of wall thickness of a polyethylene pipe molded by the pipe molding die according to the present invention. It can be understood from FIG. 8 that a difference between a maximum wall thickness and a minimum wall thickness of the pipe, viz., an ununiformity in wall thickness is extremely equal to or smaller than 0.3 mm, and therefore a neat circle is depicted.

Set conditions in this case are as follows:

Curvature radius R=25 mm

α=75–90° a, b=2 mm

Nominal dimension=200 mm (major diameter: 216 mmφ, and average wall thickness: 17 mm).

Figure 9:
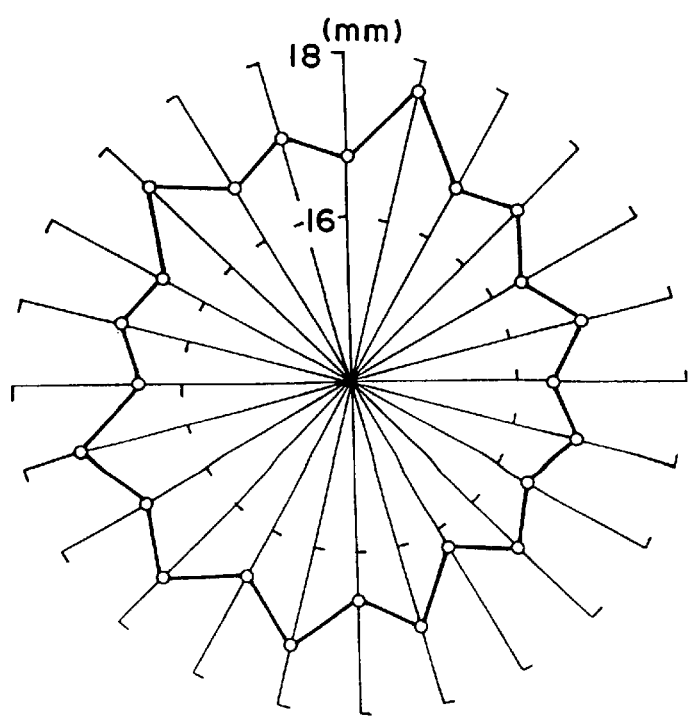
FIG. 9 is a diagram of comparison with FIG. 8, showing a distribution of wall thickness of a polyethylene pipe molded by a prior art pipe molding die.
Figure 10:
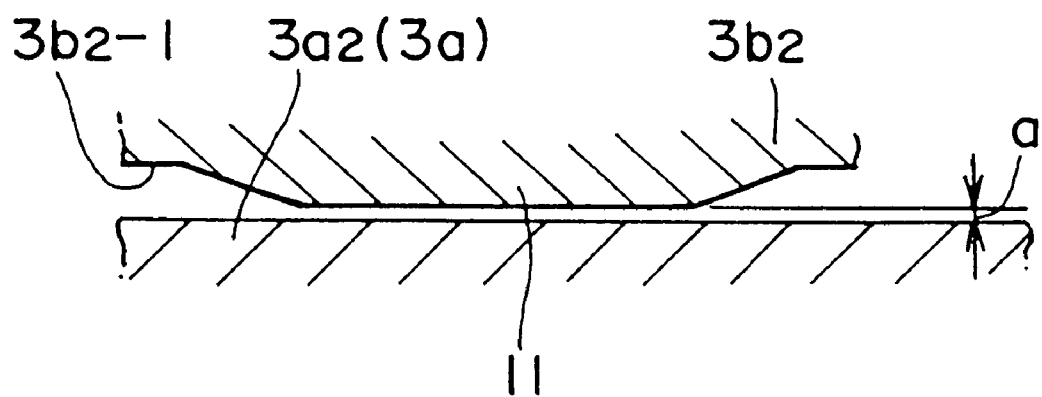
FIG. 10 is a view illustrating a hitherto-existing throttle portion having no resin reservoir, and corresponding to FIGS. 3, 6 and 7.

FIG. 9 is a diagram compared with FIG. 8, and shows a distribution of wall thickness of the polyethylene pipe molded by the pipe molding die in the prior art, wherein the polyethylene pipe having the same nominal dimension of 200 as the one described above is manufactured by the die with the throttle 11 including no resin reservoir 13 as shown in FIG. 10. As can be understood from FIG. 9, the difference between the maximum wall thickness and the minimum wall thickness of the pipe, i.e., the ununiformity in wall thickness is 1.6 mm, and ruggedness on a pipe surface (a pipe internal surface) can be seen.

Thus, the die 1 according to the present invention includes the resin reservoir 13, whereby there could be obtained the-polyethylene pipe with a remarkably reduced ununiformity in wall thickness, which pipe is substantially completely round in cross-section. Note that the pipe is not confined to the polyethylene pipe using polyethylene as a pipe raw material but may embrace a polyolefine pipe using polyolefine as a pipe raw material. The die 1 according to the present invention is, however, optimal to the molding of the polyethylene pipe.

As a result of generalizing the tests performed by the present inventors, the major diameter (diameter) and the average wall thickness of the resin pipe P formed by the pipe molding die 1 applied thereto are set respectively within a range of 60 mm–500 mm and a range of 5 mm–50 mm, however, it could be recognized that the resin pipe becomes preferable by setting the major diameter of the resin pipe P within a range of 80 mm–220 mm and the average wall thickness of the pipe P within a range of 8 mm–20 mm.

Then, in the distribution of wall thickness of the resin pipe P, the wall thickness ununiformity conceived as the difference between the maximum wall thickness and the minimum wall thickness can be set within a range of 0 mm–1.0 mm in the normal setting described above and a range of 0 mm–0.3 mm in the preferable setting described above, and therefore it proved that the preferable resin pipe can be manufactured.

When the resin pipe P is thus manufactured by use of the die 1 according to the present invention, the resin p extruded from the die 1 can be flowed uniformly in whichever position on the flow path 3d within the die 1 owing to the resin reservoir 13, and it is therefore feasible to restrain a momentum of the flow of the molten resin p. Consequently, the flow of the molten resin p gets smooth enough to enhance the rectifying effect. Accordingly, it is possible to prevent the occurrence of the ununiformity in wall thickness of the resin pipe P to be molded, and also it is possible to obtain the resin pipe P with the minor and major diameters that are both substantially completely round.

Incidentally, it can be expected that the above effect is enhanced all the more in combination with the throttle effect.

Further, the ununiformity in wall thickness can be a,reduced, and hence the problems described in the items (1)–(3) in the description of the prior art can be obviated.

As discussed above, in the pipe molding die according to the present invention, the flow of the molten resin is rectified by the resin reservoir, and the flow of the resin extruded from the die can be made uniform in whichever position in the peripheral direction on the flow path within the die. Therefore, the pipe molding die is applicable as the one capable of preventing the ununiformity in wall thickness of the resin pipe to be molded. Further, the resin pipe manufactured by using this pipe molding die has no ununiformity in wall thickness, and therefore a utility value thereof becomes higher correspondingly.

What is claimed is:

1. A pipe molding die comprising:
 a throttle part including:
  a core;
  a shell part, fitted to said core, for forming a flow path through which a molten resin as a pipe raw material flows between said core and said shell part;
  a resin reservoir provided in at least one of said core and said shell part as a portion of said flow path, said resin reservoir having a recessed shape in cross-section which is formed in a curved-surface configuration and a ring-like shape circumscribing a central axis of said pipe molding die with this central axis centered, said flow path being substantially perpendicular to said resin reservoir;
  a first constricting portion immediately preceding said resin reservoir which constricts said flow path, said first constricting portion circumscribing said central axis of said pipe molding die, said first constricting portion having a continuous annular shape of a constant first diameter around an entire circumference of said first constricting portion;
  a first straight portion preceding said first constricting portion and circumscribing said central axis of said pipe molding die, said first straight portion having a second diameter;
  a first tapering portion immediately preceding said first constricting portion and interconnecting said first straight portion to said first constricting portion, said first tapering portion having a diameter which varies between said first diameter and said second diameter;
  a second constricting portion immediately following said resin reservoir which constricts said flow path, said second constricting portion circumscribing said central axis of said pipe molding die, said second constricting portion having a continuous annular shape of a constant third diameter around an entire circumference of said second constricting portion;
  a second straight portion following said second constricting portion and circumscribing said central axis of said pipe molding die, said second straight portion having a fourth diameter; and
  a second tapering portion immediately following said second constricting portion and interconnecting said second constricting portion to said second straight portion, said second tapering portion having a diameter which varies between said third diameter and said fourth diameter,
 wherein said molten resin flows sequentially past said first straight portion, said first tapering portion, said first constricting portion, said resin reservoir, said second constricting portion, said second tapering portion, and said second straight portion in a direction substantially parallel to said central axis of said pipe molding die.

2. The pipe molding die according to claim 1, wherein said flow path has a throttle in a shape constricted thinner than other portions along said flow path, and said throttle is formed with said resin reservoir.

3. The pipe molding die according to claim 1, wherein said resin reservoir is semi-circular in cross-section, a radius of curvature thereof is 10 mm–100 mm, and an angle made by each of tangential lines at both ends of the semi-circular arc of said resin reservoir and by the central axis is 15°–120°.

4. The pipe molding die according to claim 3, wherein the radius of curvature is 25 mm, and the angle is 75°–90°.

5. The pipe molding die according to claim 1, wherein said resin reservoir is provided in both said core and said shell part.

6. The pipe molding die according to claim 1, wherein said resin reservoir extends around said shell par in a direction perpendicular to said central axis.

7. A pipe molding die comprising:
 a throttle part including:
  a core;
  a shell part, fitted to said core, for forming a flow path through which a molten resin as a pipe raw material flows between said core and said shell part;
  a resin reservoir provided in at least one of said core and said shell part as a portion of said flow path, said resin reservoir having a recessed shape in cross-section which is formed in a curved-surface configuration and a continuous annular shape circumscribing a central longitudinal axis of said pipe molding die, said flow path being substantially perpendicular to said resin reservoir;
  a first constricting portion immediately preceding said resin reservoir which constricts said flow path, said first constricting portion circumscribing said central longitudinal axis of said pipe molding die, said first constricting portion having a continuous annular shape of a constant first diameter around an entire circumference of said first constricting portion;

a first straight portion preceding said first constricting portion and circumscribing said central axis of said pipe molding die, said first straight portion having a second diameter;

a first tapering portion immediately preceding said first constricting portion and interconnecting said first straight portion to said first constricting portion, said first tapering portion having a diameter which varies between said first diameter and said second diameter;

a second constricting portion immediately following said resin reservoir which constricts said flow path, said second constricting portion circumscribing said central axis of said pipe molding die, said second constricting portion having a continuous annular shape of a constant third diameter around an entire circumference of said second constricting portion;

a second straight portion following said second constricting portion and circumscribing said central axis of said pipe molding die, said second straight portion having a fourth diameter; and a second tapering portion immediately following said second constricting portion and interconnecting said second constricting portion to said second straight portion, said second tapering portion having a diameter which varies between said third diameter and said fourth diameter, wherein said molten resin flows sequentially past said first straight portion, said first tapering portion, said first constricting portion, said resin reservoir, said second constricting portion, said second tapering portion, and said second straight portion in a direction substantially parallel to said central longitudinal axis of said pipe molding die.

8. The pipe molding die according to claim 7, wherein said flow path has a throttle in a shape constricted thinner than other portions along said flow path, and said throttle is formed with said resin reservoir.

9. The pipe molding die according to claim 7, wherein said resin reservoir is semi-circular in cross-section, a radius of curvature thereof is 10 mm–100 mm, and an angle made by each of tangential lines at both ends of the semi-circular arc of said resin reservoir and by the central axis is 15°–120°.

10. The pipe molding die according to claim 9, wherein the radius of curvature is 25 mm, and the angle is 75°–90°.

11. The pipe molding die according to claim 7, wherein said resin reservoir is provided in both said core and said shell part.

12. The pipe molding die according to claim 7, wherein the resin reservoir extends around said shell part in a direction perpendicular to said central axis.

13. The pipe molding die according to claim 1, wherein said first tapering portion is conical.

14. The pipe molding die according to claim 13, wherein said second tapering portion is conical.

15. The pipe molding die according to claim 1, wherein said diameter of said first tapering portion varies linearly.

16. The pipe molding die according to claim 15, wherein said diameter of said second tapering portion varies linearly.

17. The pipe molding die according to claim 7, wherein said first tapering portion is conical.

18. The pipe molding die according to claim 17, wherein said second tapering portion is conical.

19. The pipe molding die according to claim 7, wherein said diameter of said first tapering portion varies linearly.

20. The pipe molding die according to claim 19, wherein said diameter of said second tapering portion varies linearly.

* * * * *